US012751887B2

(12) United States Patent
Vaccaro et al.

(10) Patent No.: US 12,751,887 B2
(45) Date of Patent: Oct. 6, 2026

(54) POWERED EXOSKELETON JOINT

(71) Applicants: FONDAZIONE ISTITUTO ITALIANO DI TECNOLOGIA, Genoa (IT); I.N.A.I.L. ISTITUTO NAZIONALE PER L'ASSICURAZIONE CONTRO GLI INFORTUNI SUL LAVORO, Rome (IT)

(72) Inventors: Riccardo Vaccaro, Genoa (IT); Simone Traverso, Genoa (IT); Michele Canepa, Genoa (IT); Lorenzo De Michieli, Genoa (IT); Matteo Laffranchi, Genoa (IT)

(73) Assignees: FONDAZIONE ISTITUTO ITALIANO DI TECNOLOGIA, Genoa (IT); I.N.A.I.L. ISTITUTO NAZIONALE PER L'ASSICURAZIONE CONTRO GLI INFORTUNI SUL LAVORO, Rome (IT)

( * ) Notice: Subject to any disclaimer, the term of this patent is extended or adjusted under 35 U.S.C. 154(b) by 574 days.

(21) Appl. No.: 18/551,533

(22) PCT Filed: Mar. 21, 2022

(86) PCT No.: PCT/IB2022/052549
§ 371 (c)(1),
(2) Date: Sep. 20, 2023

(87) PCT Pub. No.: WO2022/200989
PCT Pub. Date: Sep. 29, 2022

(65) Prior Publication Data

US 2025/0120872 A1 Apr. 17, 2025

(30) Foreign Application Priority Data

Mar. 24, 2021 (IT) ........................ 102021000007085

(51) Int. Cl.
*A61H 3/00* (2006.01)
*A61H 1/02* (2006.01)

(52) U.S. Cl.
CPC ............... *A61H 3/00* (2013.01); *A61H 1/024* (2013.01); *A61H 1/0244* (2013.01)

(58) Field of Classification Search
CPC .. A61H 2201/165; A61H 3/00; A61H 1/0244; A61F 5/0102; A61F 2/70; A61F 2005/0155
See application file for complete search history.

(56) References Cited

U.S. PATENT DOCUMENTS 8,425,620 B2 * 4/2013 Johnson .................. A61F 2/585 74/490.06
10,537,488 B2 1/2020 Farris et al.
(Continued)

FOREIGN PATENT DOCUMENTS

CN 212146411 U 12/2020
WO 2012044621 A1 4/2012

OTHER PUBLICATIONS

International Search Report from corresponding PCT Application No. PCT/IB2022/052549, Jul. 7, 2022.

*Primary Examiner* — Timothy A Stanis
*Assistant Examiner* — Christopher E Miller
(74) *Attorney, Agent, or Firm* — Workman Nydegger

(57) ABSTRACT

A powered exoskeleton joint includes an actuation unit and an actuation arm mounted oscillatingly onto the actuation unit. The actuation unit moves the actuation arm oscillatingly around the joint. The actuation arm is coupled to the frame of an exoskeleton by a coupling system. The coupling system includes a first part integral with the actuation arm and another part integral with the exoskeleton frame, which parts are insertable at least partially inside each other, as a male part and a female part, the male part passing from an
(Continued)

inserted condition to an extracted condition, and vice-versa. The female part has tapered surfaces complementary to external surfaces of a male end of the male part and includes a pin for locking the male part in the inserted condition, mounted translatable according to a direction incident to the insertion direction, which engages with a corresponding locking housing provided on the male part.

13 Claims, 9 Drawing Sheets

(56) References Cited

U.S. PATENT DOCUMENTS

| | | | | |
|---|---|---|---|---|
| 2007/0027409 | A1* | 2/2007 | Katoh | A61H 3/00<br>601/5 |
| 2010/0298746 | A1* | 11/2010 | Shimizu | B25J 9/0006<br>601/35 |
| 2011/0313331 | A1* | 12/2011 | Dehez | A61H 1/0285<br>601/33 |
| 2014/0142475 | A1* | 5/2014 | Goldfarb | A61H 1/0262<br>601/35 |
| 2015/0142130 | A1* | 5/2015 | Goldfarb | A61H 3/00<br>623/25 |
| 2016/0374836 | A1* | 12/2016 | Errico | A61F 2/64<br>24/592.1 |
| 2017/0049659 | A1 | 2/2017 | Farris et al. | |
| 2018/0161188 | A1* | 6/2018 | Zistatsis | A61H 1/024 |
| 2019/0015287 | A1 | 1/2019 | Witte et al. | |
| 2019/0344429 | A1 | 11/2019 | Grenier et al. | |
| 2019/0344432 | A1* | 11/2019 | Grenier | B25J 9/08 |
| 2020/0121485 | A1* | 4/2020 | Mcdaid | A61F 5/0123 |
| 2022/0087833 | A1* | 3/2022 | Farris | A61F 2/60 |
| 2022/0395417 | A1* | 12/2022 | Mooney | A61F 5/0127 |

* cited by examiner

POWERED EXOSKELETON JOINT

BACKGROUND

The present invention relates to a powered exoskeleton joint comprising an actuation unit and at least one actuation arm oscillatingly mounted on said actuation unit, which is configured to move the actuation arm oscillatingly around the joint.

In addition, the actuation arm can be coupled to the frame of an exoskeleton by means of a coupling system.

Exoskeletons are generally used for rehabilitation and/or assistive activities and are constituted by wearable devices that aim to help users perform certain movements in order to enhance the muscle capacity of such users or restore lost or limited muscle and joint function.

The powered joints are therefore generally placed at the level of the joints of the user, for example at the knee, hip, elbow or shoulder, and are connected to segments of the exoskeleton frame at the lower or upper limbs of the user.

There are several cases in the world of people who have lost full mobility of their limbs, especially due to diseases or debilitating accidents. The purpose of exoskeletons is to provide patients with a powered aid to restore lost mobility and perform rehabilitation exercises that can significantly improve quality of life.

The problems of daily management of these devices are closely linked with those relating to their usability.

Powered joints are known in the state of the art, disclosed, for example, in the documents U.S. Pat. No. 10,537,488 and US20190015287.

However, these documents describe powered joint systems in conjunction with exoskeletons that do not allow a quick and safe assembly/disassembly of the different components.

Furthermore, the systems disclosed and known in the state of the art do not allow autonomous management of exoskeletons and joints by patients.

SUMMARY

The present invention therefore aims to boost as much as possible the usability of exoskeletons, through the creation of a modular system, easy to manage independently, to facilitate the portability and usability of the exoskeleton.

In this regard, the joint that is the subject matter of the present invention requires a coupling system that comprises two parts, one of which is integral with the actuation arm and the other with the exoskeleton frame.

The two parts are configured to fit, at least partially, inside each other, so as to identify a male part and a female part.

The male part passes accordingly from an inserted condition to an extracted condition, and vice-versa, with regard to the female part.

Furthermore, the female part has tapered surfaces complementary to the outer surfaces of a mating end of the male part and includes at least one locking pin of the male part in the inserted condition, mounted translatable according to a direction incident to that of insertion, which locking pin engages with a corresponding locking housing provided on the male part.

The result is a powered joint that is easy to assemble by the patient during dressing and, at the same time, guarantees the possibility of easily replacing any damaged joints.

According to a preferred embodiment, the mating end has a truncated pyramid shape.

It follows that the female part will comprise a concave truncated pyramid shape element adapted to cooperate with the mating end of the male part.

This choice has made it possible to obtain robust coupling between the two parts through the simultaneous contact of the four surfaces of the truncated pyramid to provide high structural stiffness and high transmission capacity of the forces acting on the system.

In addition, the shape of the pyramid guarantees the self-centring of the two parts, during insertion of the male part into the female part, facilitating the operation of mounting the joint onto the exoskeletal frame.

According to one possible embodiment, the female part comprises an elastic element configured to keep the locking pin in an engaged condition as the male part is inserted into the female part, there being a locking pin extraction element configured to compress the elastic element.

So, once mechanical mating has taken place between the two parts, they are held in position by the locking pin.

As will be evident from the illustration of several embodiments, the presence of the elastic element makes it possible to obtain joint coupling during automatic assembly, without the need for particular tools.

In combination with this feature, the presence of the extraction element makes it possible even for a user with motor disabilities to release the joint from the exoskeletal frame in a particularly easy manner.

Advantageously, the locking pin and the extraction element are mounted on the female part by means of a support plate which has slotted holes for the insertion of fastening screws.

As will be apparent from the illustration of several embodiments, such a configuration makes it possible to achieve means of adjusting the fastening condition of the male part with the female part, so as to avoid the occurrence of mechanical play between said parts.

In fact, due to the machining tolerances and the wear of the coupling components, due to possible malfunctions unwanted play could occur between the two parts constituting the coupling, as this is both a mechanical and electrical connection area.

Accordingly, the joint that is the subject matter of the present invention facilitates interchangeability of the male-female pairs without requiring strict tolerances of these parts during manufacture.

Since the joint that is the subject matter of the present invention is used in combination with exoskeletal frames, it is essential to provide an appropriate power supply system to allow operation of all the motors present, as well as a system for transmitting the information of the sensors present in the joint.

For this reason, according to a refinement of the joint that is the subject matter of the present invention, the male part comprises at least one first electrical connector that can be coupled to at least one second electrical connector provided on the female part.

Furthermore, in order to protect the electrical boards of the electrical connectors from any impacts during the phase of insertion of the male part into the female part, which could impact the electronic components, the female part comprises at least one guide element, provided in such a way that it is protruding with respect to the inner surface, which guide element cooperates, during the phase of insertion of the male part into the female part, with a corresponding guide slot provided on the male part.

According to a preferred embodiment, the mating end has, on a first side, the first electrical connector and, on a second side, opposite the first side, the locking housing.

Similarly, the female part has the locking pin on the side that can be coupled to the first side and the second electrical connector on the side that can be coupled to the second side.

Clear separation is obtained between the part responsible for data transmission and power supply, on the one hand, and the mechanical fastening part, on the other, in order to protect the electronic boards against any moving parts that could compromise their integrity.

According to a further embodiment, the actuation arm comprises two upright elements extending from the female part in the direction of the actuation unit, on two opposite sides, so as to surround the actuation unit partially.

One possible embodiment of such uprights will be illustrated in the drawings appended to the present patent application.

This configuration ensures high structural rigidity of the joint, making it possible to achieve not only the structural strength required by the application, but also to minimize weight and encumbrances.

In addition, this design choice makes it possible to use one side of the joint for strain gauge sensing of the exoskeletal frame.

This means the joint can detect both the torque applied at a given moment by the internal gear motor, fundamental for the development of torque controls, and the axial force acting on the frame, when the patient places his/her weight on the ground.

In addition, the presence of such strain gauge sensors contributes to improve the behaviour of the exoskeleton, through the implementation of sensor information inside the exoskeletal control system.

From what has just been disclosed, it is evident that the application scenarios of the joint that is the subject matter of the present invention are limited not solely to the case of exoskeletons. The joint can be used, for example, in any industrial application where the presence of a module of this type is necessary, and where it is possible to make the male and female connection parts as described above.

In view of the advantageous aspects disclosed above, the present invention further relates to an exoskeleton for the lower limbs of a user, comprising a frame consisting of a pelvis segment attachable to the pelvis, at least one femur segment and at least one tibia segment.

There is also at least one powered joint adapted in order to connect at least the pelvis segment to the femur segment or the femur segment to the tibia segment.

In particular, the powered joint is made according to one or more of the features disclosed above.

Thanks to the use of the joint disclosed above, a quick coupling system is created for the modules of an exoskeleton, which makes it possible to disassemble the exoskeleton completely into modules of small size and low weight that can therefore be managed easily by the patient.

In accordance with an embodiment of the exoskeleton that is the subject matter of the present invention, the pelvis segment comprises a central processing unit and a power supply unit, while the central processing unit and/or the power supply unit is connected to the joint by means of connecting cables inserted into the femur segment and/or into the tibia segment.

An exoskeleton is thus realized that integrates therein the connections of the power supply and information transmission system, preventing any external cables from creating possible stumbling points or undesired grips for users.

The present invention therefore makes it possible to achieve a modular lower limb exoskeletal system.

Starting from the exoskeletal application, there will also be the option of applying the modular system in the medical, manufacturing and logistics fields. Indeed, the module can be used in all industrial applications requiring the presence of a high-performance compact actuated joint capable of being mechanically and electrically connected and disconnected quickly and independently in the absence of mechanical play.

The compact size of the system makes it independently transportable by the patient and the modularity of the system facilitates rapid replacement of individual parts in the event of malfunctions.

From what has been disclosed above, it should be evident that both the joint and the exoskeleton that is the subject matter of the present invention present peculiar aspects with respect to systems known in the state of the art, including:

- compactness, due to the reduction in size and weight,
- maximization of surface contact/stress distribution, as the structure of the coupling and the frame is designed to work in its entirety to distribute stresses as much as possible and avoid stress concentrations,
- recovery of mechanical play by way of the configuration that provides an adjustable locking part to remove play completely from the couplings and improve the quality of the connection,
- coupling autonomy: the electromechanical coupling of all exoskeleton modules is automatic and can be done independently; no tools are needed, not even in the uncoupling phase,
- coupling speed: the coupling operation is unique, and created in the simplest way to facilitate the user,
- double-support joint: the double-support structure is the most favourable to increase structural performance, and thus decrease size and weight,
- modular joint: the actuated joint is identical for all four hip joints, and constitutes an interchangeable module which also provides simultaneous electromechanical coupling, facilitates operations and reduces them to a single, automatic, tool-free manoeuvre,
- rapid truncated pyramid-shaped coupling: the pyramid shape aids self-centring and maximizes transmission of forces in the structure, implementing inherent basic safety, since it is impossible to lose the coupling when the user's weight is applied to the structure.

BRIEF DESCRIPTION OF THE DRAWINGS

These and other features and advantages of the present invention will become clearer from the following disclosure of some exemplary embodiments illustrated in the accompanying drawings in which.

DETAILED DESCRIPTION OF VARIOUS EMBODIMENTS

It should be noted that the Figures appended to the present patent application illustrate only some possible embodiments of the powered joint and exoskeleton that are the subject matter of the present invention, in order to understand better the advantages and features disclosed herein.

These embodiments are therefore to be understood as purely illustrative and not limited to the inventive concept of the present invention, namely, that of creating a powered joint with a mechanical and electrical coupling system to an exoskeleton frame, which allows a user to couple the powered joint independently, maintaining an efficient and safe fastening of the joint itself, through the creation of a module can be easily assembled by the user in the donning phases, while implementing the possibility of easily replacing any damaged modules.

In particular, the Figures refer to a use of the joint that is the subject matter of the present invention in combination with an exoskeleton for the lower limbs; however, as mentioned above, this joint can be used in different industrial applications, without the need to make any substantial changes thereto.

Figure 1:
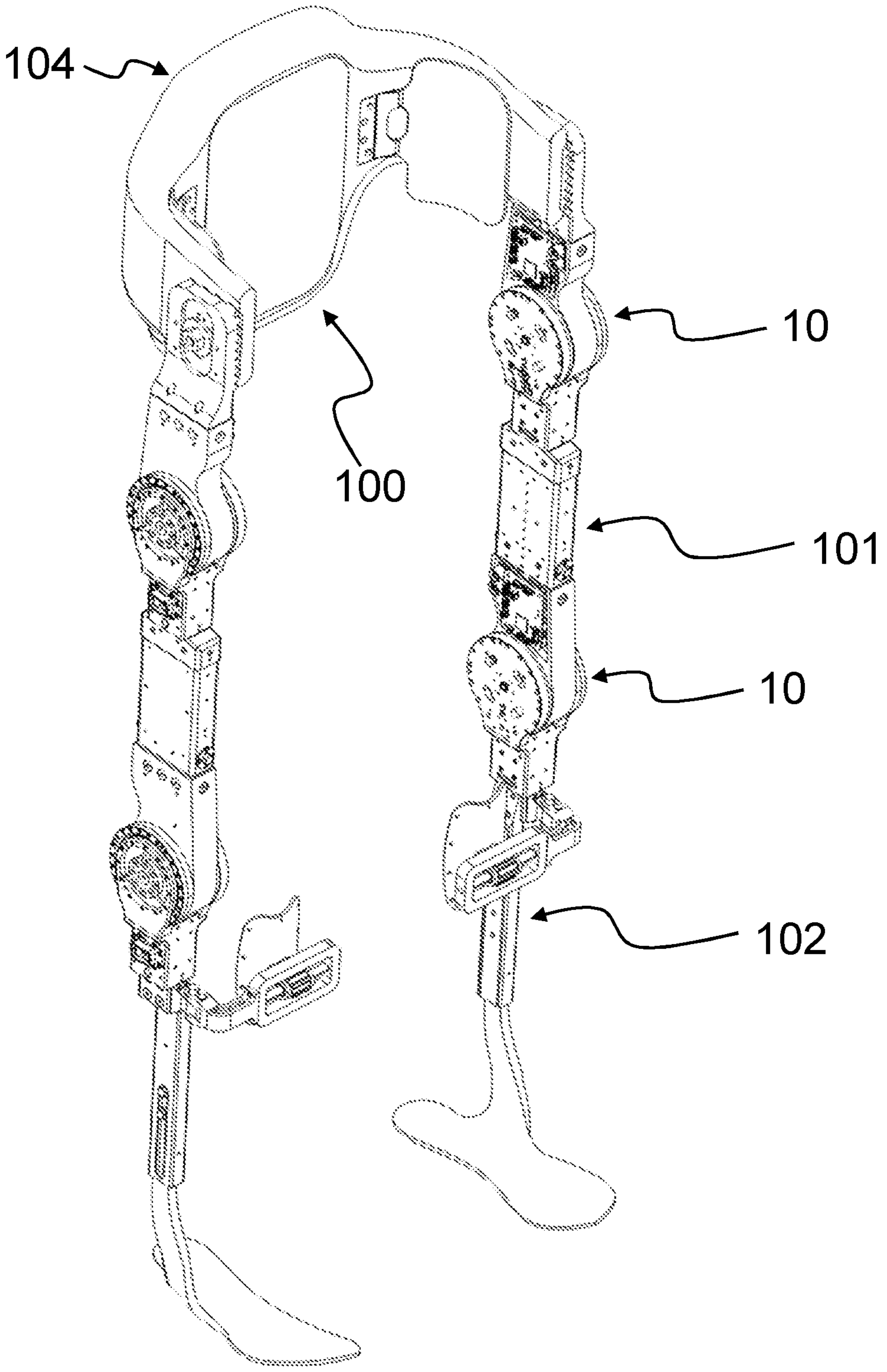
FIG. 1 shows a perspective view of one possible embodiment of the exoskeleton that is the subject matter of the present invention.

With particular reference to FIG. 1, the exoskeleton that is the subject matter of the present invention is illustrated according to one possible embodiment.

The exoskeleton illustrated in FIG. 1 refers to the movement of the lower limbs and provides a symmetrical configuration with respect to the sagittal plane of a user.

In particular, the exoskeleton comprises a pelvis segment 100 attachable to the pelvis of a user connected to one femur segment 101 and one tibia segment 102 per leg.

The exoskeleton is therefore made up of a series of levers, segments 101 and 102, which have a relative movement between them, adapted to mimic the movements of a user's leg, which movement is ensured by the activation of joints 10 that allow the levers to rotate one with respect to the other.

The pelvis segment 100 further supports a central processing unit and an electricity power unit.

In the specific case of FIG. 1, the central processing unit and the power supply unit are inserted within a single device 104, fixed to the pelvis segment 100.

The device 104 is therefore responsible for the generation of the control signals for activating the frame of the exoskeleton, as well as distributing the electricity necessary for operating the electric motors provided in the joints 10 (disclosed below) and positioned at the joints.

The joints 10 comprise sensors adapted to detect the operating conditions of the joints themselves and the positioning of the various segments 101 and 102 of the exoskeleton frame.

All data and power are transmitted along the exoskeleton by means of connection cables, not illustrated in the Figures, starting from the device 104 and connecting to the joints 10 through at least segment 101.

Preferably at least segment 101 consists of a tubular element, capable of housing connecting cables which have interfaces at the ends for connecting joints 10.

According to one possible embodiment, segment 102 may also accommodate connecting cables in the case of a powered ankle or in the case of a sensorised insole.

According to the variant illustrated in the Figures, the ankle part, i.e., the connecting zone between segment 102 and the foot, consists of a passive joint, which does not need connections either for power or for data transmission.

The joints 10 therefore do not simply perform a function relating to the movement of segments 101 and 102, but can be fastened to or detached from the frame of the exoskeleton by means of a coupling system, disclosed below, so as to ensure functional connection, both mechanical and electrical, between the various components of the exoskeleton.

Figure 2:
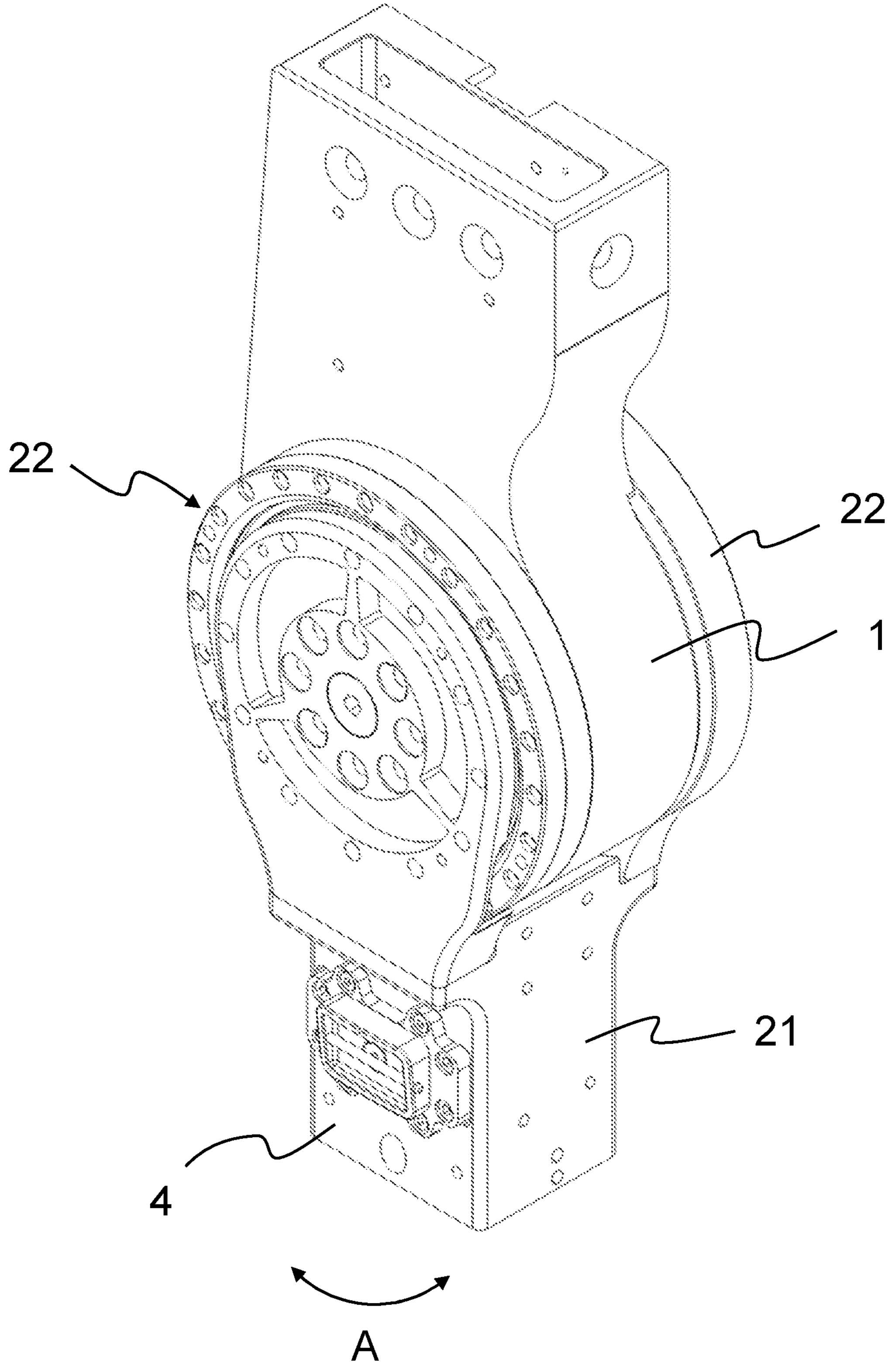
FIG. 2 illustrates a perspective view of one possible embodiment of the joint that is the subject matter of the present invention.

FIG. 2 illustrates a view of the joint that is the subject matter of the present invention according to one possible embodiment.

In particular, the joint 10 comprises an actuation unit 1 and an actuation arm 2.

The actuation arm 2 is mounted oscillatingly onto the actuation unit 1, in such a way that the arm 2 can oscillate, driven by the actuation unit, according to the direction indicated by the arrow A of FIG. 2.

It follows that the actuation unit 1 constitutes an input element which transmits the motion to an output element, i.e., the actuation arm 2.

Figure 5A:
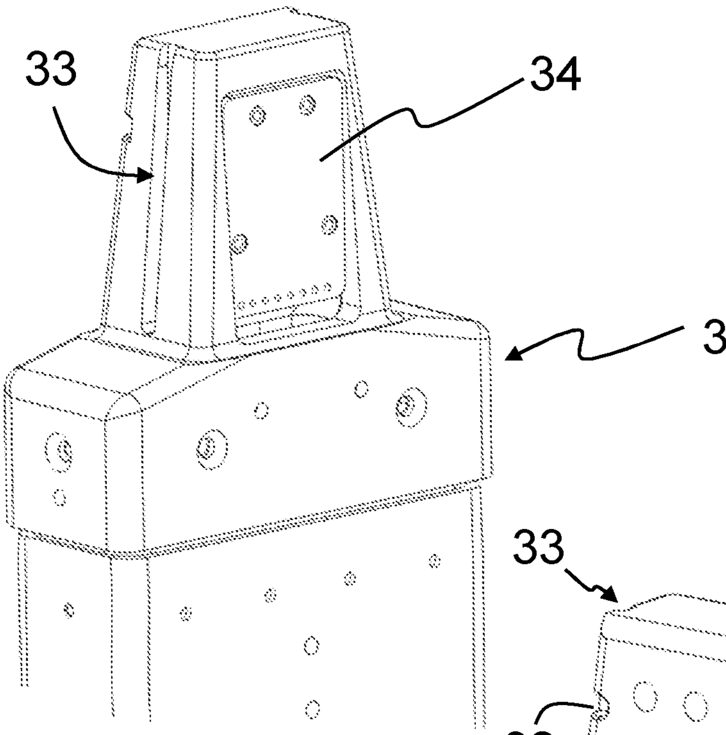
FIGS. 5*a* and 5*b* illustrate two views of the male part belonging to the joint that is the subject matter of the present invention.
Figure 5B:
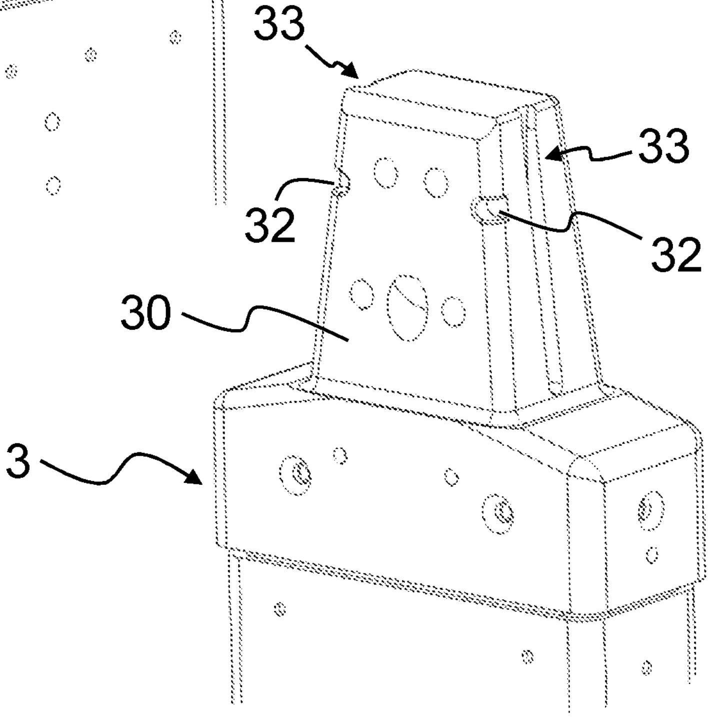

According to the variant illustrated in the Figures, the joint 10 that is the subject matter of the present invention has a coupling system wherein it is possible to mate the female end 21 of the arm 2 with a corresponding male end 31, illustrated in FIGS. 5*a* and 5*b*.

In particular, the female end 21 constitutes a female part of the coupling system, while the male end 31 constitutes a male part 3 of the coupling system.

The female part is obviously integral with the actuation arm 2, while the male part 3 is integral with the segment of the exoskeleton, so that, once the male part 3 is inserted into the female part, the movement of the actuation arm 21 also moves the exoskeleton frame connected to the male part.

According to the variant of the joint illustrated in the Figures, the male end 31 comprises a truncated pyramid-shaped element, while the female end 21 comprises a concave truncated pyramid-shaped element.

Mating between the male end 31 and the female end 21 is therefore a positive-locking fit.

As will be disclosed below, once in the inserted condition, the male end is locked into the female end 21 by means of at least one locking pin.

The locking pin is supported by an elastic element operated manually through an extraction element (see following disclosure), so as to create a quick coupling/uncoupling system, based on a positive-locking fit, of the joint 10 to the exoskeleton frame.

Figure 3:
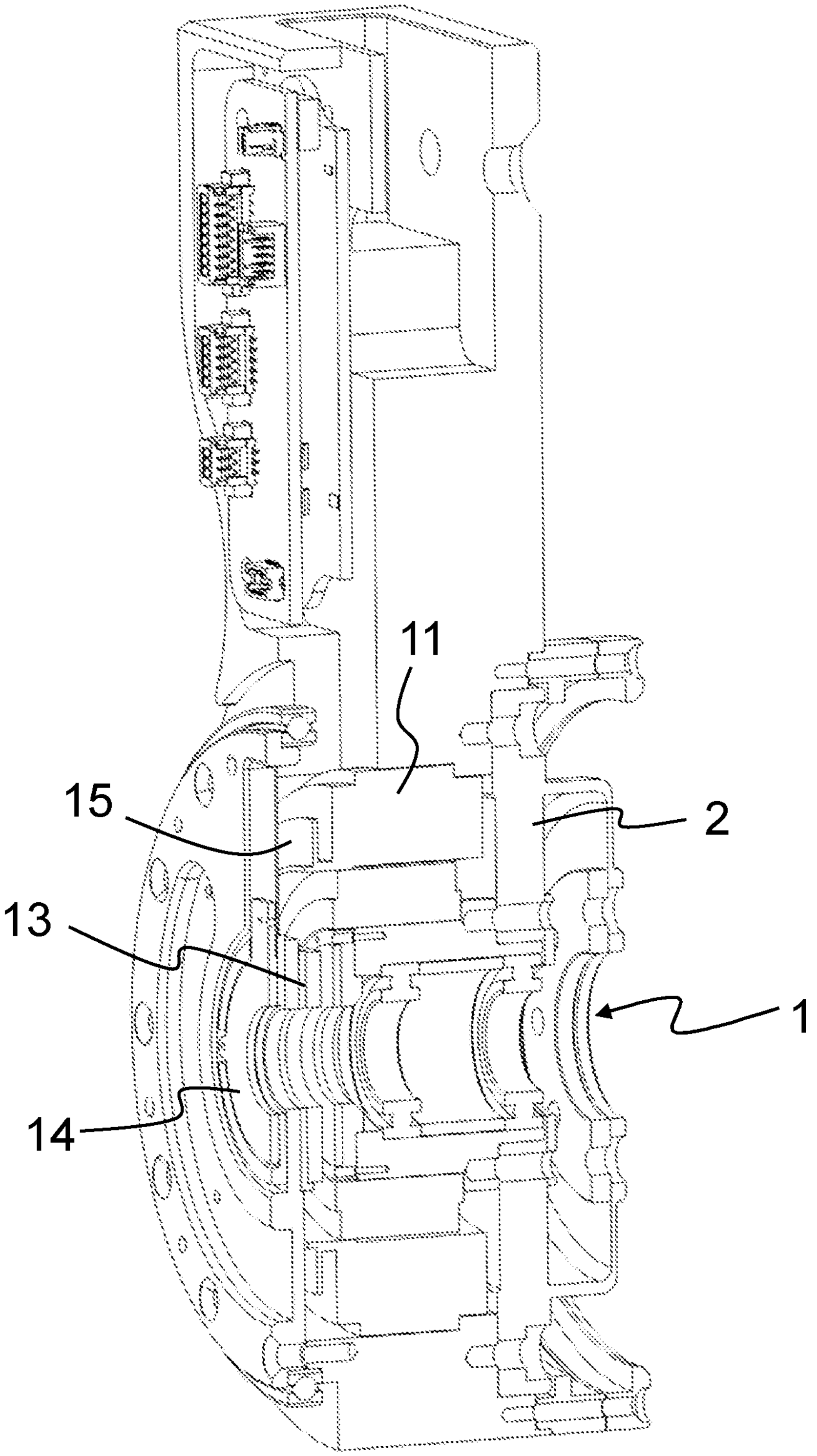
FIG. 3 illustrates a section of the joint that is the subject matter of the present invention.

Before going into detail about the coupling system, it should be noted that the powered joint 10, in particular the actuation unit, of which one possible embodiment is illustrated in FIG. 3, can provide the torque and speed necessary for movement of the exoskeleton in accordance with the energy required for the patient's walk. The peak values that can be provided by joint actuation are 100 Nm for torque and 60 rpm for speed.

The actuation unit comprises a motor-gearbox assembly comprising a commercial frameless motor 11, commercial flexwave gearbox with a 50:1 reduction ratio 12, and is equipped with highly integrated control sensors.

With reference to FIG. 3, the sensors are:

Fast commercial optical encoder 13, for direct control of the rotating part of the motor,

- Hall sensors on motor stator 15, for direct control of the rotating part of the motor,
- Commercial potentiometric slow encoder 14 for control of the joint's position, alternatable with a slow commercial optical encoder for any higher resolutions required.

The actuation unit 1 has been sized in accordance with the mechanical power required by the patient involved in the various tasks provided for in the protocol and which would be required during a possible general personal use (walking, sitting and lifting, climbing stairs, running on inclined planes).

Figure 4:
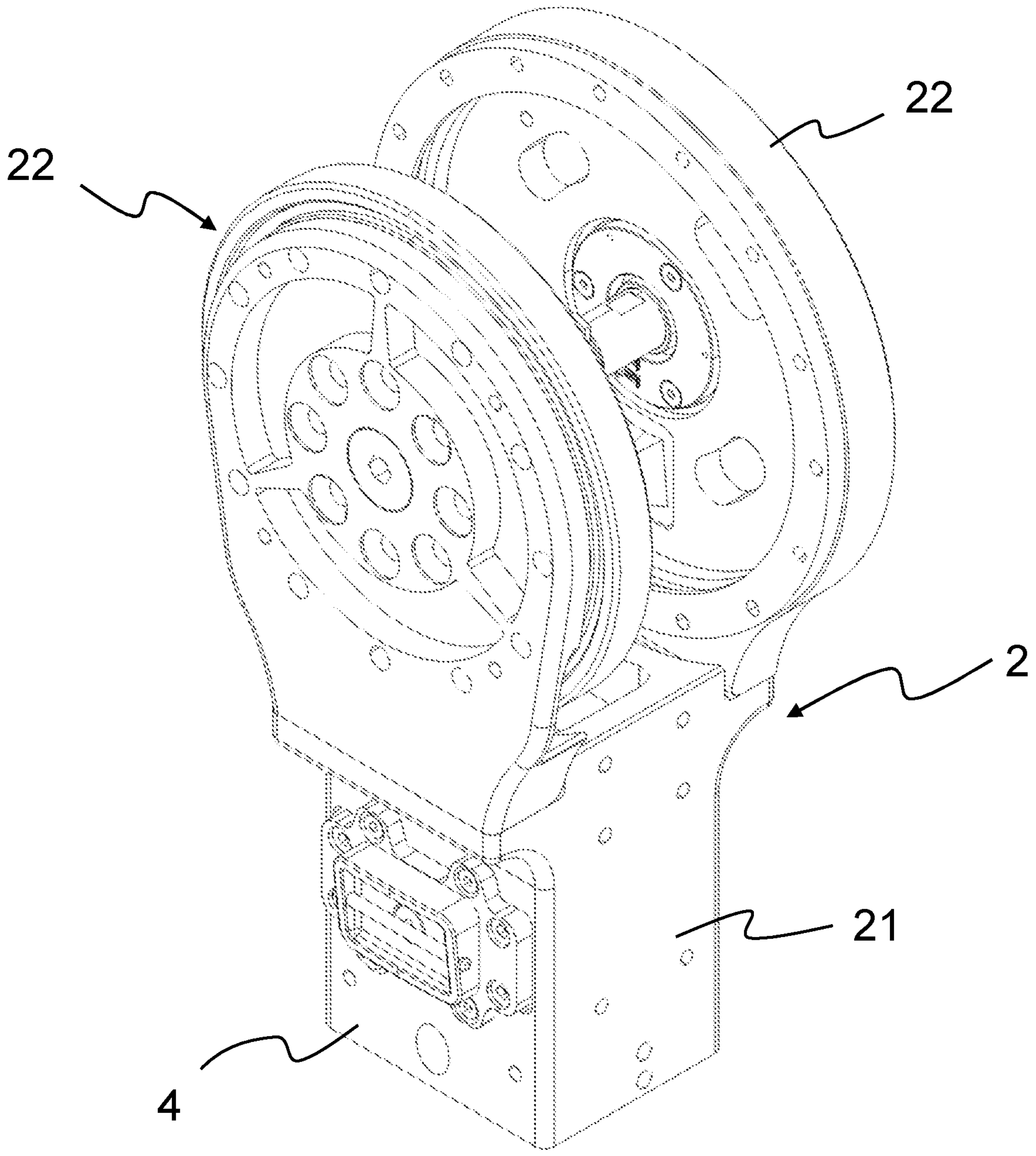
FIG. 4 illustrates a view of a preferred embodiment of the actuation arm belonging to the joint that is the subject matter of the present invention.

The actuation unit 1 transmits its motion to the actuation arm 2 by way of specific transmission means consisting of two uprights 22 illustrated in FIGS. 2 and 4, extending from the female end 21 in the direction of the actuation unit 1 on two opposite sides, so as to surround the actuation unit 1 partially.

It follows that the actuation arm 2 consists of the concave truncated conical element (the female end 21) and the uprights 22, that is, a central frame and two lateral supports.

Once the mechanical mating has taken place between the male part 3 and the female part i.e., once the male end 31 has been inserted into the female end 21, these are held in position by means of a passive spring system 4 placed laterally, i.e., along a face of the female end 21, as illustrated in FIGS. 2 and 4.

Figure 6A:
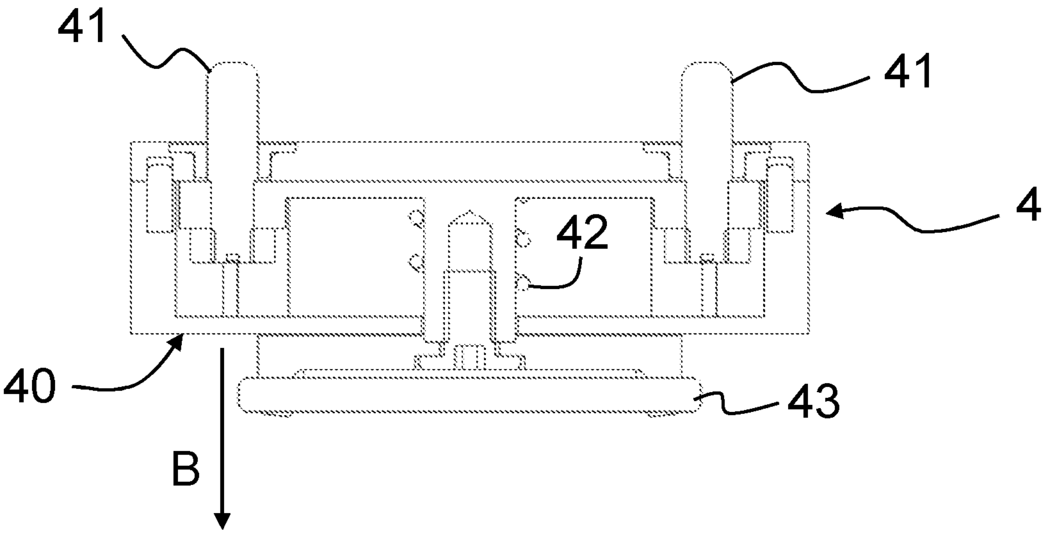
FIGS. 6*a* to 6*c* illustrate three views of the mechanical play adjustment means belonging to the joint that is the subject matter of the present invention.
Figure 6B:
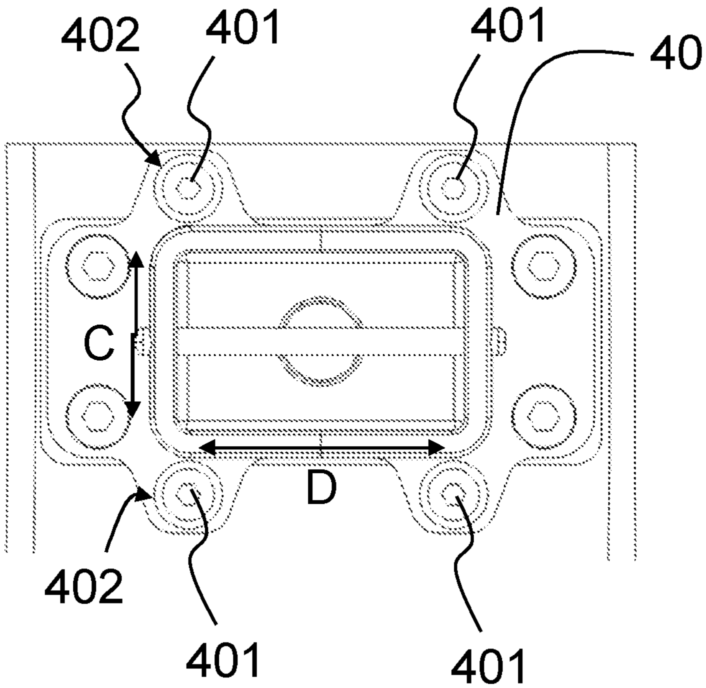

FIGS. 6*a* and 6*b* illustrate one possible embodiment of such a passive spring system 4.

In particular, FIG. 6*a* shows a section of such a system 4, consisting of two lateral locking pins 41, a central coil spring 42, adapted to push the pins 41 into their neutral position, and an extraction element, in particular a knob 43 which, once pulled, allows the locking pins 41 to retract from the neutral position and disconnect the female end 21 from the male part 3.

In the neutral position, during engagement of the male end 31, the pins 41 are pushed externally from the inclined plane of the face of the male end 31, causing compression of the spring 42.

With mating terminated, i.e., when the male end 31 has completed its insertion stroke inside the female end 21, the pins 41 are pushed into a neutral position by the expansion of the spring 42.

Indeed, the spring 42 passes from the compressed condition to the extended condition (corresponding to the neutral condition), since two locking housings 32, illustrated in FIG. 5*b*, are obtained on the face of the male end 31.

During insertion of the male end 31, the face 30 slides inside the female end 21 in contact with a corresponding face of the concave element of the female part and compresses the spring 42 until the locking pins 41 are at the locking housings 32. At this point, the pins 41 can be inserted into the locking housings 32 and lock the stroke of the male end 31.

Having entered the housings 32, the two pins 41 axially bind the male part 3 within the female part, preventing undesired uncoupling of the joint during use.

To uncouple the joint, it is sufficient to pull the knob 43 manually in the direction indicated by arrow B in FIG. 6*a*, thus removing the pins 41 from the housings 32 of the male end 31, and manually disassemble the male part 3 from the female part.

FIG. 6*b* illustrates one possible embodiment of the passio locking system 4, in which there is a support plate 40 onto which the knob 43, the pins 41 and the coil spring 42 are mounted.

In order to ensure precise tightening of the locking pins 41, with minimum resulting play, the passive spring system 4 is mounted onto said support base 40 which can be adjusted into position with respect to the female end 21 onto which it is mounted.

This adjustment is achieved by means of screws 401 and slotted through holes 402 which are larger than the screws 401 themselves.

In this way, play can be finely recovered, since fastening of the system 4 is carried out only after insertion of the male end 31, and contact of the four faces with the corresponding internal faces of the female end 21 and locking with the locking pins 41 in the corresponding locking housings 32.

The support plate 40 is then fastened to body of the female end 21 using the four screws 401 and the holes 402, which allow for the elimination of play in the locking of the locking pins 41. This adjustment operation must only be performed when a new truncated pyramid-shaped coupling is first mounted, or when unwanted play occurs.

Thus, unwanted play in the behaviour of the structure can be eliminated by floating the passive locking system 4 with the pins 41, such system being finely adjustable during the first assembly and subsequently repeatable.

The dimensions of the slotted holes 402 therefore make it possible to adjust plate 40 fastening according to the direction of the arrows C and D of FIG. 6*b*.

Figure 6C:
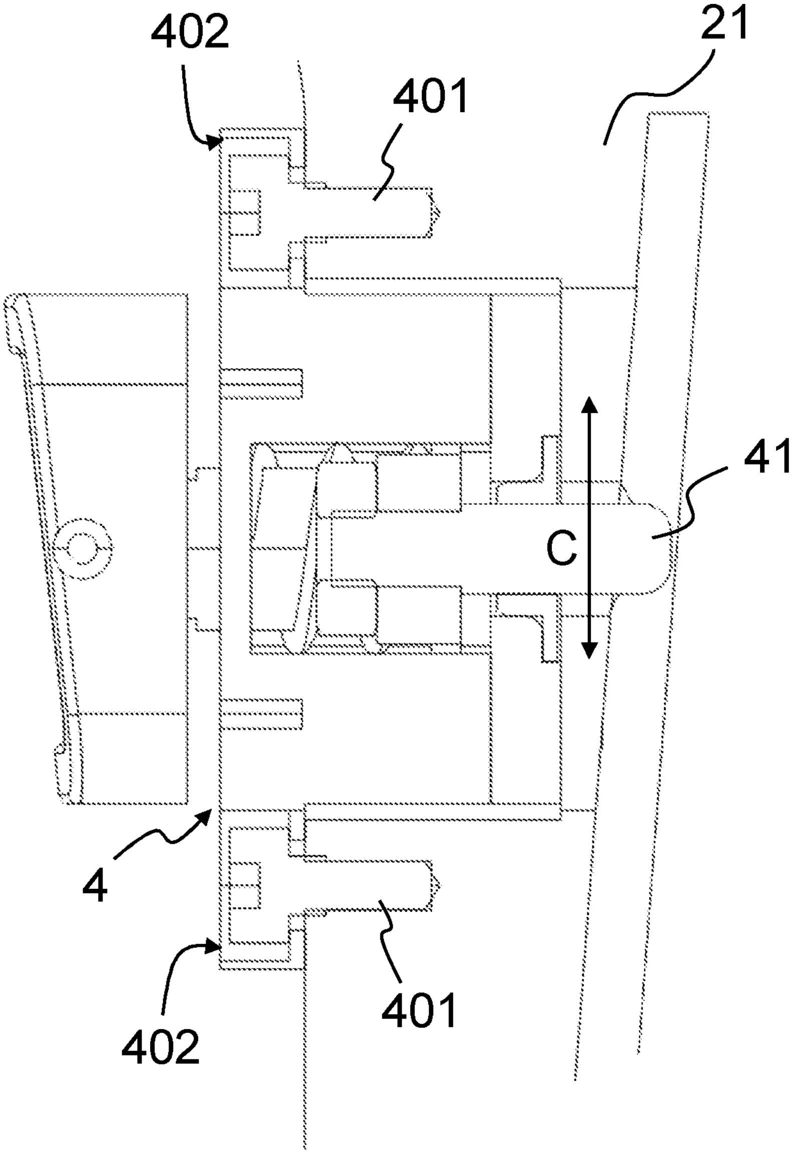

In FIG. 6*c*, it is evident that the housing on the female end 21 of the female part is larger than the body of the passive locking system 4. Based on the section of FIG. 6*c*, it can be observed that, even internally, the pins 41 have a housing of larger diameter, as do the tightening screws 401. Hence, the combination of these elements allows the passive locking system 4 to be positioned in the desired manner.

As anticipated with regard to the exoskeleton of FIG. 1, the battery power supply and the main electronic board for managing the system are located at the rear of the pelvis 100, and from this area, therefore, the power and communication cables directed for the four joints 10 depart. In each joint 10 there is also a local motor control board, bringing the total number of boards to four.

For the exoskeleton to function properly, the power supply and data stream must be brought from the central unit to the motors via a communication bus. In addition, the quick-attack system should facilitate exoskeleton donning operations in a non-invasive manner.

For this reason, according to the variant shown in the Figures, the male part comprises at least one first electrical connector coupled to at least one second electrical connector provided on the female part.

Figure 7:
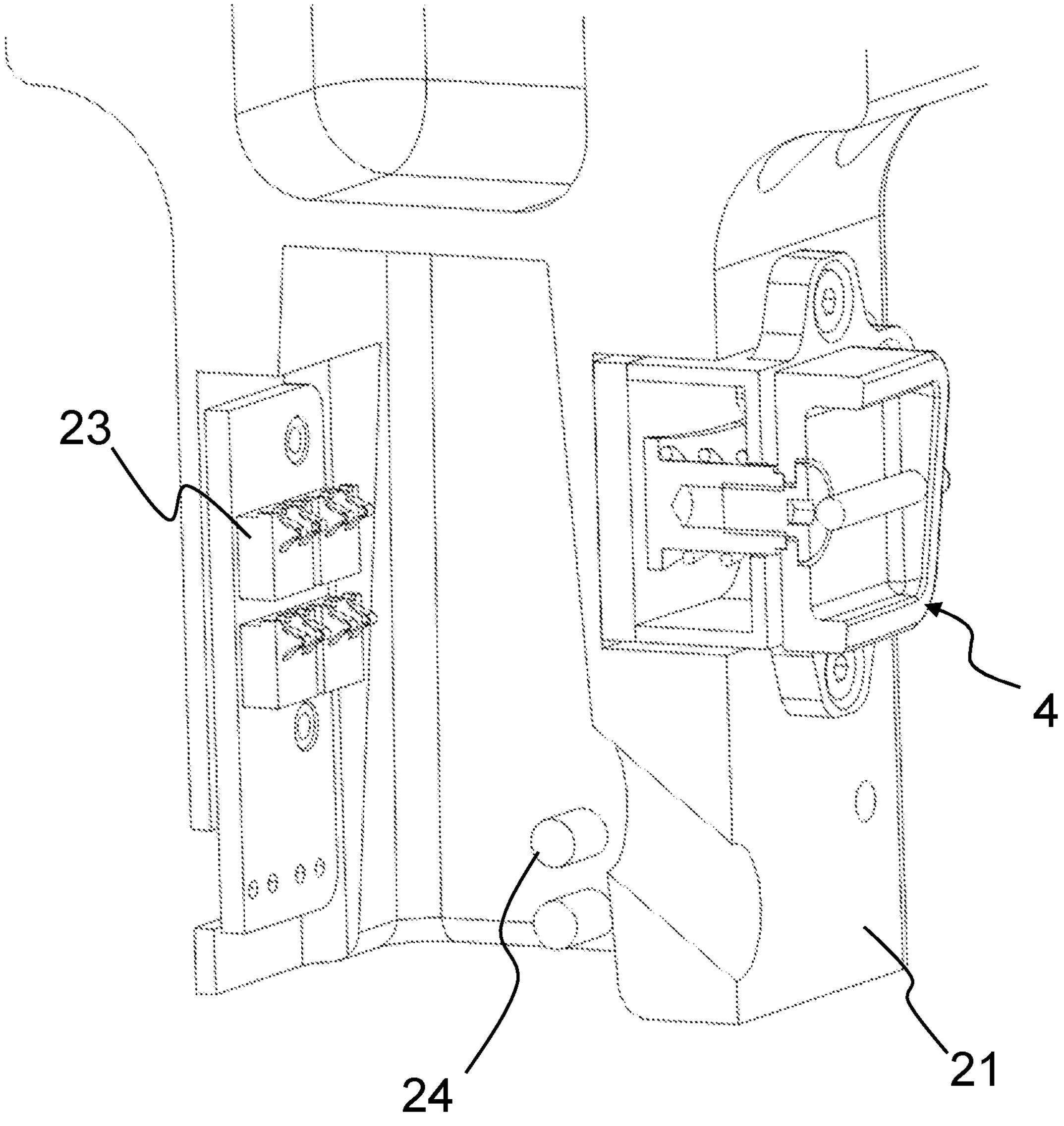
FIGS. 7 and 8 illustrate two details of the coupling system belonging to the joint that is the subject matter of the present invention.
Figure 8:
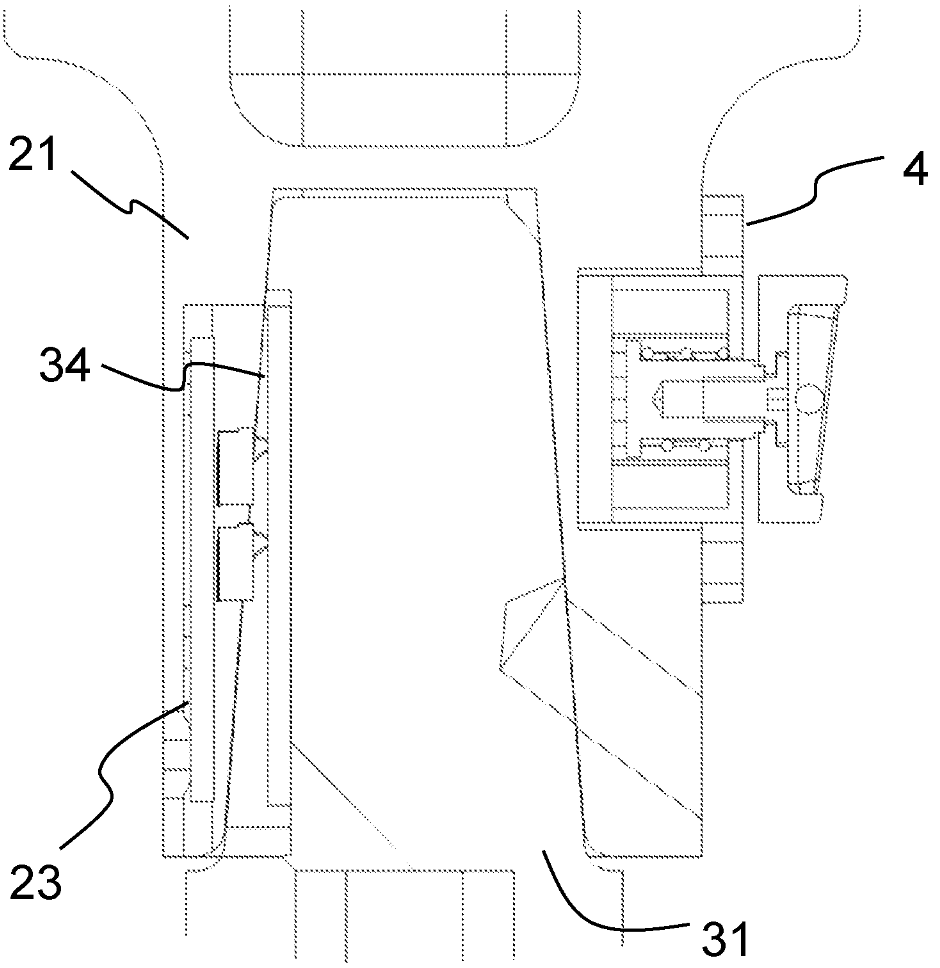

With particular reference to FIG. 7, on the inner face of the concave pyramid-shaped female end 21 opposite the locking pins 41, there are spring-loaded sliding electrical contacts 23, which find their counterpart during engagement in the female electrical contacts 34 (tracks), mounted on the truncated pyramid-shaped male end 31, FIG. 5*a*. These contacts make the necessary electrical connection between the different parts of the exoskeleton.

They are sliding contacts sized in such a way as to transmit the currents necessary for operation of the motors, and in sufficient quantity, specifically eight, such as to guarantee the necessary power and communication connections.

Again, with reference to FIGS. 5*a* and 5*b*, it can be noted that the part of the electrical contacts and the part of mechanical fastening are provided on two different faces, that is, on two opposite sides of the truncated pyramid-shaped male end 31.

Obviously, this distribution is also provided on the concave female end 21 of the female part.

To prevent the electrical contacts from being damaged during the insertion of the male part into the female part, two guide elements 24, FIG. 7, have been inserted, placed laterally on the pyramid-shaped female component.

These guide elements 24 are clamped onto the pyramid-shaped female end 21, protrude within the cavity on opposite sides, and guide the pyramid-shaped male end 31 during mating by sliding along two guide slots 33, FIGS. 5*a* and 5*b*, formed on the latter to keep it clear of creeping contacts during operation.

Advantageously, the guide slots 33 have mechanical play such as to allow the two pyramid-shaped parts to be positioned with simultaneous contact on the four faces, without the guide elements 24 interfering in this phase.

Furthermore, it should be noted that the guide slots 33 are asymmetrically arranged on the two opposite sides of the male end 31.

This solution can be seen in FIG. 5*b*, in which the sliding guide 33, visible in its entirety in FIG. 5*b*, is positioned in the center of one of the faces of the male end 31, while the other sliding guide 33 is positioned offset with respect to the first, in particular it is placed closer to the face of the male end 31 in which the locking housing 32 is obtained.

In a similar manner, the guide elements 24, for which see FIG. 7, are also arranged asymmetrically on the two sides of the inner surface of the female part, so as to cooperate correctly with the guide slots 33.

With reference again to FIGS. 5*a* and 5*b*, the male end 31 is preferably made up of a rectangular-based truncated pyramid-shaped element.

The truncated pyramid-shaped geometric element is symmetrical with respect to two planes orthogonal to each other, passing through the central axis of the male part 3, which axis is parallel to the direction of insertion of the male part 3 into the female part.

In addition, due to its rectangular base, the truncated pyramid-shaped element has four flat walls constituting the lateral surface, which are equal two to two, of which two are wider and two narrower.

The first electrical connector 34, FIG. 5*a*, and the locking housings 32, FIG. 5*b*, are placed on the wider walls, while the sliding guides 33 are placed on the narrower walls, one for each wall.

While the invention is susceptible to various modifications and alternative constructions, some preferred embodiments have been shown in the drawings and disclosed in detail.

It should be understood, however, that there is no intention to limit the invention to the specific illustrated embodiment but, on the contrary, the aim is to cover all the modifications, alternative constructions and equivalents falling within the scope of the invention as defined in the claims.

The use of “for example”, “etc.” or “or” refers to non-exclusive non-limiting alternatives, unless otherwise stated.

The use of “includes” means “includes but is not limited to”, unless otherwise stated.

The invention claimed is:

1. A powered exoskeleton joint comprising:

an actuation unit; and at least one actuation arm mounted oscillatingly on said actuation unit, said actuation unit being configured to move said actuation arm oscillatingly around said joint, said actuation arm being coupled to the frame of an exoskeleton by means of a coupling system, wherein said coupling system comprises two parts, one of which is integral with the actuation arm and the other integral with the exoskeleton frame, which parts are configured to be at least partially inserted into each other, so as to identify a male part and a female part, the male part passes from an inserted condition to an extracted condition, and vice-versa, with respect to the female part, the female part having tapered surfaces complementary to the external surfaces of a male end of the male part, the male end including at least two guide slots, a first electrical connector on a first side of the external surfaces, and at least one locking housing provided on a second side of the external surfaces opposite the first side, said female part comprising a second electrical connector and at least one pin for locking the male part in the inserted condition, the at least one pin mounted translatable according to a direction incident to the insertion direction, which locking pin engages with a corresponding locking housing provided on the male part.

2. The joint according to claim 1, wherein the male end has a truncated pyramid shape, which truncated pyramid has side walls consisting of flat surfaces.

3. The joint according to claim 1, wherein the female part comprises an elastic element configured to keep the locking pin engaged when the male part is inserted inside the female part, there being an extraction element of the locking pin, configured to compress the elastic element.

4. The joint according to claim 1, in which the male end is configured in such a way that during the insertion of the male part into the female part, at least one outer surface of the male end is in contact with a corresponding tapered surface of the female part and in such a way that, during insertion, the male end causes the compression of the elastic element until the locking pin is at the locking housing.

5. The joint according to claim 1, wherein said locking pin and said extraction element are mounted onto the female part by means of a support plate, which support plate has slotted holes for inserting fastening screws.

6. The joint according to claim 1, wherein said male part comprises at least the first electrical connector configured to be coupled to the second electrical connector provided on the female part.

7. The joint according to claim 1, wherein the female part comprises at least one guide element provided protruding with respect to the inner surface, which guide element cooperates, during the insertion phase of the male part into the female part, with a corresponding guide slot provided on the male part.

8. The joint according to claim 1, wherein the male end has, on a first side, the first electrical connector and, on a second side, opposite the first side, the locking housing, the female part having the locking pin on the side that is configured to be coupled to the first side and the second electrical connector on the side that is configured to be coupled to the second side, the first and second sides are arranged on the side surface of said male end, which surfaces are oriented along the insertion direction of the male part into the female part.

9. The joint according to claim 1, wherein said actuation arm comprises two upright elements extending from the female part in the direction of the actuation unit, on two opposite sides, so as to surround said actuation unit partially.

10. The joint according to claim 1, wherein the at least two guide slots cooperate with corresponding guide elements present on the female part, said at least two guide slots being arranged on opposite sides of the lateral surface of the male end asymmetrically with respect to a plane oriented in the insertion direction of the male part into the female part.

11. The joint according to claim 1, wherein said male end has a truncated pyramid shape with a rectangular base, the lateral surface consisting of four walls, two wider walls that are equal and two narrower walls that are equal, the first electrical connector and the locking housing being positioned separately on the wider walls and at least two guide slots being positioned separately on the narrower walls.

12. An exoskeleton for the lower limbs of a user, comprising a frame consisting of a pelvis segment attachable to the pelvis, at least one femur segment and at least one tibia segment, at least one powered joint being present for connecting at least said pelvis segment to said femur segment or the femur segment to the tibia segment, wherein said joint is made according to claim 1.

13. The exoskeleton according to claim 12, wherein said pelvis segment comprises a central processing unit and a power supply unit, said central processing unit and/or said power supply unit being connected to said joint through connection cables inserted into the femur segment and/or into the tibia segment.

* * * * *